US008500027B2

(12) United States Patent
Kishimoto et al.

(10) Patent No.: US 8,500,027 B2
(45) Date of Patent: Aug. 6, 2013

(54) HIGH SPEED OPTICAL CODE READING (75) Inventors: Yuri Kishimoto, Warabi (JP); Shiping Liu, Saitama (JP)

(73) Assignee: Optoelectronics Co., Ltd., Saitama (JP)

( * ) Notice: Subject to any disclaimer, the term of this patent is extended or adjusted under 35 U.S.C. 154(b) by 0 days.

(21) Appl. No.: 13/128,000

(22) PCT Filed: Nov. 17, 2008

(86) PCT No.: PCT/US2008/083770
§ 371 (c)(1),
(2), (4) Date: Jul. 8, 2011

(87) PCT Pub. No.: WO2010/056256
PCT Pub. Date: May 20, 2010

(65) Prior Publication Data
US 2011/0253784 A1 Oct. 20, 2011

(51) Int. Cl.
*G06K 7/10* (2006.01)
(52) U.S. Cl.
USPC .................................. 235/472.01; 235/462.2
(58) Field of Classification Search
USPC .......................................... 235/462.2, 472.01
See application file for complete search history.

(56) References Cited

U.S. PATENT DOCUMENTS

| 4,874,933 | A | 10/1989 | Sanner | |
|---|---|---|---|---|
| 6,695,209 | B1 * | 2/2004 | La | 235/462.2 |
| 2002/0026619 | A1 * | 2/2002 | Nonin | 714/799 |
| 2005/0218231 | A1 * | 10/2005 | Massieu | 235/472.01 |
| 2006/0213997 | A1 | 9/2006 | Frank et al. | |
| 2007/0001014 | A1 | 1/2007 | Bremer et al. | |

FOREIGN PATENT DOCUMENTS

| JP | 11505042 A | 5/1995 |
|---|---|---|
| JP | 09248443 A | 9/1997 |
| JP | 2008102971 A | 5/2001 |
| JP | 2006500655 A | 1/2006 |
| JP | 2006309412 A | 11/2006 |
| JP | 2007323705 A | 12/2007 |
| JP | 2008085550 A | 4/2008 |

OTHER PUBLICATIONS

International Preliminary Report on Patentability, dated May 26, 2011 of International Application No. PCT/US08/083770, filed: Nov. 17, 2008.
International Search Report and Written Opinion, dated Jan. 14, 2009 of International Application No. PCT/US08/083770, filed: Nov. 17, 2008.
"Corresponding Japanese Patent Application 2011-536298 Office Action", Jan. 15, 2013, Published in: JP.

* cited by examiner

*Primary Examiner* — Kristy A Haupt
(74) *Attorney, Agent, or Firm* — Kaplan Breyer Schwarz & Ottesen, LLP (57) ABSTRACT In an optical code reader, at least a selected one of AGC processing and automatic focus control is performed in parallel with optical code decoding. Preferably, the selected process is initiated ahead of any signal which initiates decoding. Preferably, the selected process is performed periodically and independently of any signal which initiates decoding. In an embodiment, decoding and the selected processes are performed by different first and second processors, respectively, which operate in parallel, and the second processor performs the selected process without the first processor exercising any control over the performance of the selected process.

32 Claims, 5 Drawing Sheets

HIGH SPEED OPTICAL CODE READING

The present patent application is the U.S. national stage of International Application No. PCT/US08/083770, which was published in English on May 20, 2010 under Publication No. WO 2010/056256 A1. The disclosure of the International Application is hereby incorporated by reference in its entirety.

BACKGROUND OF THE INVENTION

The present invention relates generally to optical code detection and reading systems and, more particularly, concerns an optical code reading system and method which achieve high speed operation through parallel processing.

Anyone who has shopped in a modern supermarket is familiar with one form of optical code reader, a barcode scanner, which facilitates rapid checkout by scanning bar codes imprinted on product packages. This is a relatively undemanding application of bar code reading, as a package is essentially brought to a standstill by the operator for purposes of scanning the bar code.

More recently, optical code readers have been utilized in production lines where items are assembled, where they are inspected, where they are packaged, and the like. This application of optical code reading is far more demanding, as products move down a production line at a relatively high speed, for example, on a conveyor belt. In some instances, the optical codes may be two dimensional, requiring the decoding of a more complex optical code. In order to avoid the creation of a bottle neck on the production line, it is therefore important that accurate decoding of optical codes take place without reducing the speed at which the objects move down the production line. The speed at which an optical code can be decoded accurately therefore becomes a primary concern.

Typically, an optical code reader illuminates a remote optical code and processes the reflected light to decode the optical code (recover the contained information). In the process of setting up to read an optical code, a typical code reader will adjust an automatic gain control (AGC) circuit and will acquire automatic focus on the optical code. An AGC circuit adjusts the electronics in the reader to ensure that the signal presented to processing circuits has an amplitude in a predefined operating range, regardless of variations in the strength of the detected optical signal. Automatic focus ensures that the optical code reader obtains a well focused image of the optical code over a predefined range of distances between the code reader and the optical code, effectively increasing the depth of field of the code reader.

Figure 1:
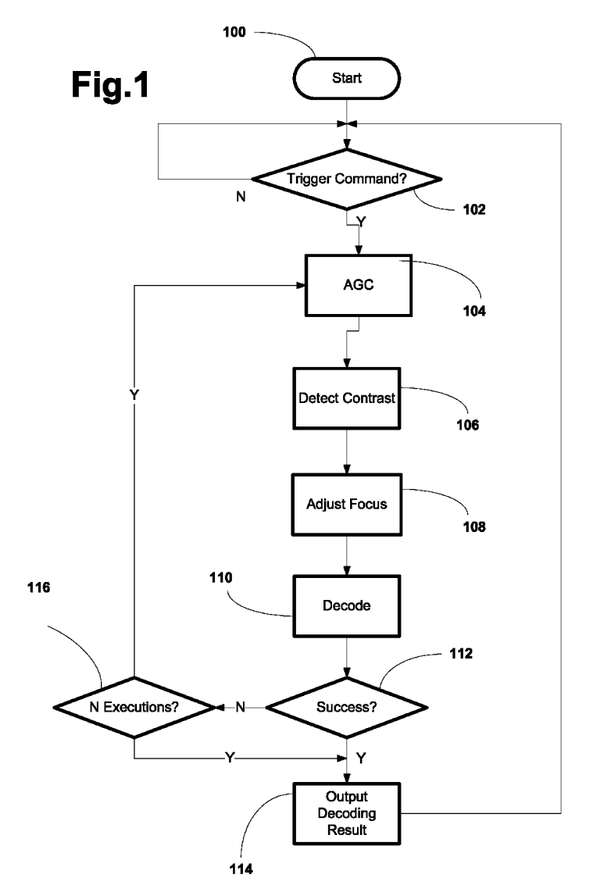
FIG. 1 is a flowchart illustrating a general process used by prior art optical code readers to decode an optical code.

FIG. 1 is a flowchart illustrating a general process used by prior art optical code readers to decode an optical code. The process starts at block 100 when the code reader is first powered on. At block 102 a test is performed to determine whether a trigger command has been received, and operation remains at this step until it is received. Typically, a trigger command is generated when an object containing the optical code is detected within a predefined operating range of the code reader. Upon the occurrence of a trigger command, processing proceeds to block 104, where the AGC is adjusted, then to block 106, where contrast is detected. Contrast measurement is a way to test the quality of focus. Processing then proceeds to block 108 where autofocus is acquired.

At block 110 the acquired code is decoded, and then at block 112, a test is performed to determine whether the decode was successful. If so, the successful result of decoding is recorded at block 114, and the process returns to block 102 to await the next trigger command. If the test at block 112 reveals that the decode was not successful, a test is performed at block 116 to determine whether a predefined number (N) of decode attempts have been made. If so, control transfers to block 114, where an unsuccessful result of decoding is recorded at block 114, and the process returns to block 102 to await the next trigger command. If N decode attempts have not been made, the test at block 116 transfers control to block 104. The AGC is then re-adjusted, contrast is re-detected, focus is reacquired, and a further attempt is made to decode the optical code.

A problem with the prior art process of FIG. 1 is that AGC adjustment and the autofocus process are relatively time consuming. Performing them in a recursive loop after the optical code is in detection range introduces so much delay that a serious limitation is imposed on the speed of decoding, so serious that reliable optical decoding of objects moving on a high speed production line has not been feasible.

SUMMARY OF THE INVENTION

In accordance with one aspect of the present invention, at least a selected one of AGC processing and automatic focus control is performed in parallel with optical code decoding. Preferably, the selected process is initiated ahead of any signal which initiates decoding. Preferably, the selected process is performed periodically and independently of any signal which initiates decoding. In an embodiment, decoding and the selected processes are performed by different first and second processors, respectively, which operate in parallel, and the second processor performs the selected process without the first processor exercising any control over the performance of the selected process.

BRIEF DESCRIPTION OF THE DRAWINGS

The foregoing and other objects, features and advantages of the present invention will be understood more completely from the following detailed description of a presently preferred, but nonetheless illustrative, embodiment in accordance with the present invention, with reference being had to the accompanying drawings, in which:

FIG. 3 FIG. 3, comprising FIGS. 3(A), and 3(B), illustrates a method of estimating the distance between an object containing the optical code and the code reader;

DETAILED DESCRIPTION OF THE PREFERRED EMBODIMENT

Figure 2:
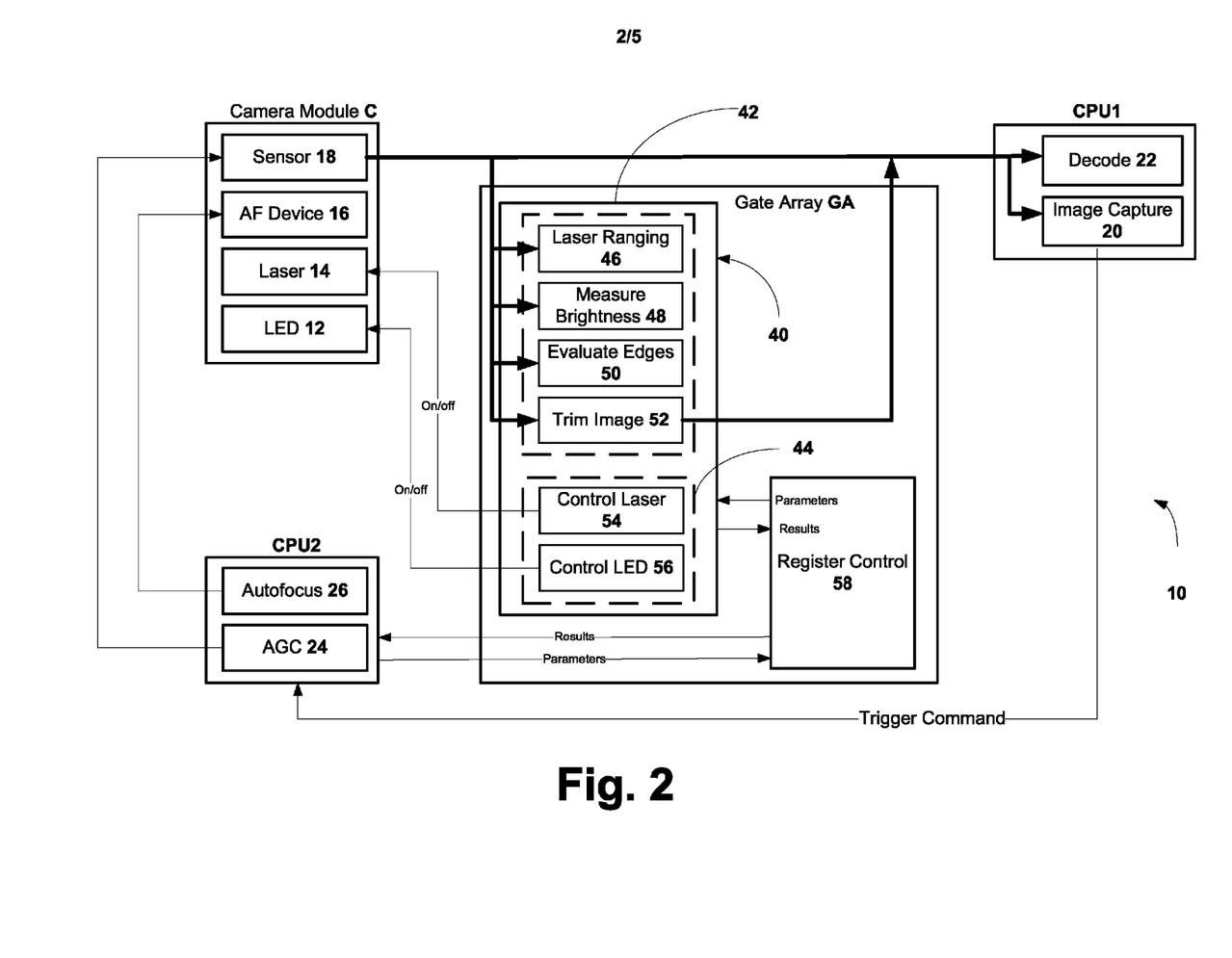
FIG. 2 is a functional block diagram of an optical code reader embodying the present invention.

Turning now to the drawings, FIG. 2 is a functional block diagram of an optical code reader 10 embodying the present invention. Optical code reader 10 broadly comprises a camera module C, which illuminates a remote optical code and captures the reflected light, to record an image of the code; a first processor CPU1, which receives and decodes the image stored in camera module C; and a second processor CPU2 which is triggered by CPU1 when it needs to process an image, CPU2 performing auto focus control processing and AGC processing, in order to control camera module C. Optical code reader 10 also includes a gate array GA which has been customized to form an application specific integrated circuit (ASIC) that extracts some characteristics from the image stored in camera C and passes them on to CPU2 for use in performing autofocus and AGC processing. The ASIC can also does processing on the image information stored in the camera module before it is passed to the CPU, and it controls illumination provided by camera module C.

Camera module C includes a visible light source 12, such as one or more LEDs, and a laser light source 14, such as one or more infrared laser diodes. Sources 12 and 14 are controlled by the gate array GA so as to provide appropriate illumination of the remote optical code. As is typical in an electronic camera, camera module C also includes an optical system, with an adjustable focus device 16 that forms an image on an image sensor 18. The adjustable focus device may be a zoom lens, such as one with a moveable element operated, for example, with a voice coil motor, or it may be an electronically controlled liquid lens. Its purpose is to provide an extended focus range so that optical codes disposed at a range of distances from camera module C can provide a well focused image on sensor 18. Sensor 18 is preferably an optical array, such as a two-dimensional array of CMOS elements.

CPU1 captures the image information stored on sensor 18 (block 20) and, based upon information received from gate array GA, decodes the image (block 22) to recover the information in the optical code. In this embodiment, optical code reader 10 can also recover the image stored in the elements of sensor 18, for example, for purposes of display. In this sense, it operates as a simple electronic camera, without decoding the optical code.

When CPU1 is ready to capture or decode an image, it sends a trigger command to CPU2. However, CPU2 does not await the trigger command in order to perform AGC processing (block 24). To accelerate operation, AGC processing is performed on an ongoing basis, so that there is minimum delay when CPU1 is ready to capture or decode an image. CPU2 performs AGC processing on the basis of information received from gate array GA related to the image stored on sensor 18. For example, if the information indicates that a weak optical signal is being received on sensor 18, AGC processing will cause the sensitivity of sensor 18 to be increased, allowing a larger signal to be stored on sensor 18 than would otherwise be the case. Similarly, gate array GA provides information to CPU2 to control adjustable focus device 16. For example, the focus might be adjusted if information from the gate array indicates that the image on sensor 18 has poor edge quality. As will be explained in more detail below, in the preferred embodiment, laser ranging is performed to measure the distance between the optical code and sensor 18. This involves illuminating the optical code with laser light when it first enters the operating range of reader 10 and sensing the reflected laser light to determine the distance of the optical code. Using this information, CPU2 then controls adjustable focus device 16 so as to focus to the actual distance of the optical code.

Gate array GA has been processed to produce an application-specific integrated circuit (ASIC). It includes a processing portion 40 with an image processing portion 42 and an illumination control portion 44. Image processing portion 42 performs various types of processing on the image information on sensor 18. As will be explained in more detail below, from the image of the laser beam on the sensor array 18, processing portion 42 is able to perform laser ranging 46. That is, it estimates the distance of the optical code. Portion 42 also performs a brightness measuring process 48 and an edge evaluation process 50 on the image information on sensor 18. Processing portion 42 can also perform an image trimming process 52, so that a trimmed image is presented to CPU1 in which inconsequential portions of the image have been deleted. Processor portion 44 performs laser control and LED control processes 54, 56, which turn on and off the laser and visible light sources 14 and 12, respectively.

Although not shown, gate array GA includes a set of registers that are under control of a register control 58. Autofocus and AGC information from CPU2 is provided to register control 58 for storage as process control parameters. Register control 58 then passes these parameters to processor 40, as needed. Similarly, processing results from processor 40 are passed to register control 58 and stored in appropriate registers as results. These results can then be passed to CPU2 for use in performing autofocus control and AGC processing. For example, results of laser ranging 46 and edge evaluation 50 are significant to controlling auto focus, and brightness evaluation 48 is significant to AGC processing. By receiving such information, CPU2 is able to control the adjustment of the adjustable focus device 16 and the gain of sensor 18.

The use of laser ranging or distance measurement is widespread today. Most electronic digital cameras use a form of infrared ranging to achieve automatic focus, and there exists a plethora of carpentry and construction tools which use laser ranging for accurate distance measurement. Laser ranging techniques are well-known. Preferably, an optical code reader embodying the present invention makes us of a particularly simple yet efficient laser ranging method described below.

Figure 3:
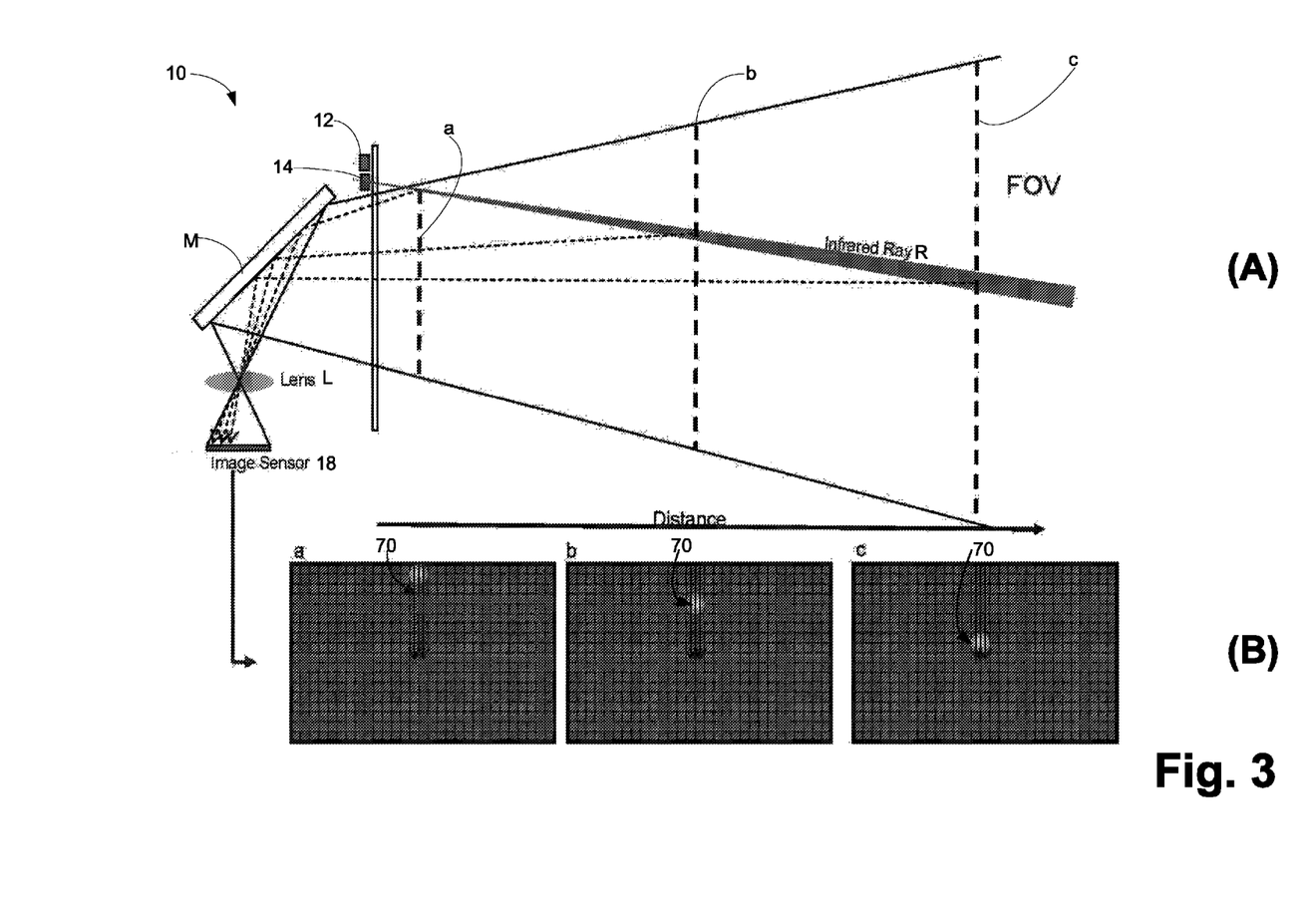

FIG. 3, comprising FIGS. 3(A), and 3(B), illustrates a method for estimating the distance between an object containing the optical code and the code reader 10, with FIG. 3(A) schematically representing the object positioned at three different locations a, b, and c (50 mm, 100 mm and 150 mm, respectively), and FIG. 3(B) depicting the image of the reflected infrared laser radiation (a spot) obtained at each of the positions a, b, and c (from left to right).

FIG. 3(A) depicts an object containing the optical code at three different distances a, b, and c from the image sensor 18 (50 mm, 100 mm and 150 mm, respectively). As may be seen, the infrared laser ray R impinges on the object at different heights at the positions a, b, and c. The reflections of the ray R from the object are represented by broken lines in FIG. 3(A). The reflected beams reflect off of mirror M and pass through a lens L, which forms an image of ray R on an image sensor 18 (lens L is part of camera module C). The image of the ray R on image sensor 18 is a spot 70 within an otherwise dark area, and as may be seen in FIG. 3(B), the spot 70 is at different heights in the image, because the beam impinges on the object at different heights in each of positions a, b, and c (imaged from left to right, respectively).

In practice optical code reader 10 would be calibrated to place the spot 70 at the top of the image formed on sensor 18 when the object is at the nearest position to be measured. Thereafter, the distance between the object and sensor 18 can be estimated, based upon the height of spot 70 in the image. Those skilled in the art could readily program this function into the system electronics or into a look-up table.

Those skilled in the art will appreciate that code reader 10 may be an imaging reader, utilizing a two-dimensional image sensor, as described, or it may be a scanning reader, which reads along a scan line. An imaging reader has been described here for convenience of description only, as has the particular laser ranging method. The invention applies equally well to a scanning reader.

Figure 4:
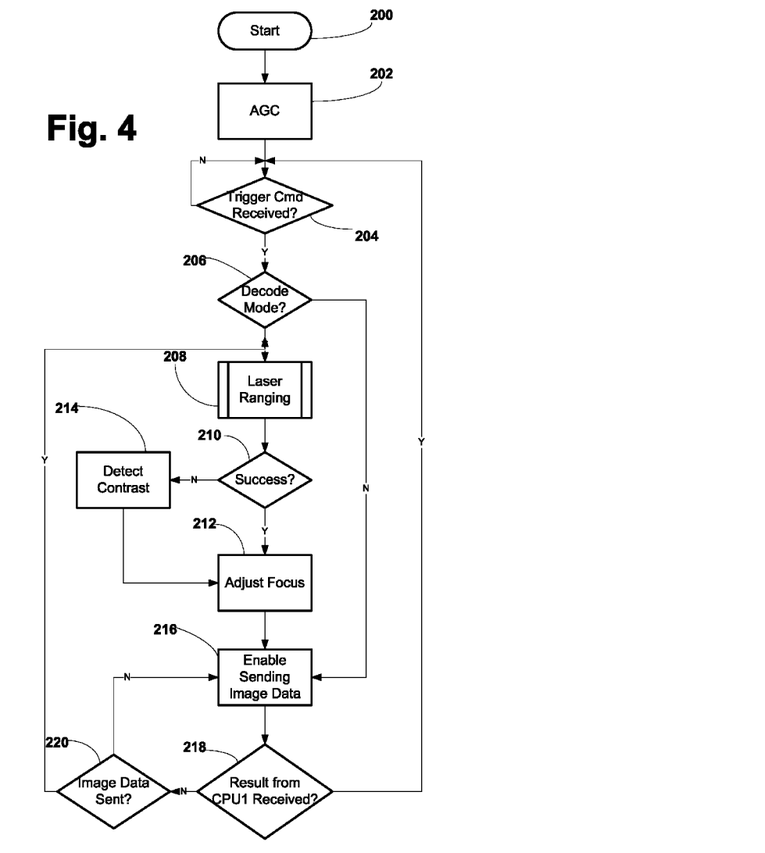
FIG. 4 is a flowchart illustrating a preferred method of operation of CPU2.

FIG. 4 is a flowchart illustrating the preferred operation of CPU2. Operation begins at block 200, preferably when optical code reader 10 is first powered on. At that time, AGC processing begins at block 202 and it continues independently of CPU1. Preferably, AGC processing is performed periodically on an ongoing basis. CPU2 receives the results of brightness measurement 48 from gate array GA and controls sensor 18 accordingly, maintaining the charge on the elements in sensor 18 within a predetermined operating range regardless of variations in the strength of the received optical signal.

Simultaneously, with AGC processing, a test is performed at block 204 to determine whether a trigger command has been received from CPU1 and, when it is received, control is transferred to block 206 where a test is performed to determine whether CPU1 is operating in the decode mode or the image capture mode. If it is operating in the image capture mode, control transfers immediately to block 216, where sending of image data to CPU1 is enabled and CPU1 produces an image, essentially performing the image capture process 20 (FIG. 2). On the other hand, if it is determined at block 206 that CPU1 is operating in the decode mode, control is transferred to block 208, where laser ranging is performed to determine the distance of the optical code. A test is then performed at block 210 to determine whether laser ranging has successfully produced a distance estimate. If so, CPU2, via its auto focus process 26, adjusts the focus of adjustable focus device 16.

Operation then continues to block 216, where sending of image data to CPU1 is enabled. A test is then performed at block 218 to determine whether CPU1 has signaled that it has a decoding result (either success or failure). If so, this portion of the process terminates and control reverts to block 204, where a new trigger command from CPU1 is awaited.

If it is determined at block 218 that no decoding result information has been received from CPU1, a test is performed at block 220 to determine whether image data was sent to CPU1. If it is determined at block 220 that image data was sent, the fact that no decoding result was produced by CPU1 indicates that the image data was not good enough to permit decoding. Control is then transferred to block 208 to repeat laser ranging. It should be kept in mind that during this entire process, AGC processing was taking place at block 202 periodically, and it continues. Therefore, any necessary adjustments to sensor 18 owing to a significant change in the intensity of the light received from the optical code would have taken place or will occur before further decoding attempts are made.

Laser ranging is a very reliable process. Therefore, the absence of a successful result at block 210 would most probably be indicative of a failure or defect in the laser ranging mechanism, and CPU2 would typically provide an alarm. However, as a backup to avoid autofocus failure when laser ranging fails, if the test at block 210 reveals that laser ranging gas not succeeded, traditional contrast detection is performed at block 214 to estimate proper focus, and focus is then adjusted at block 212. Operation then continues as if laser ranging had succeeded.

Figure 5:
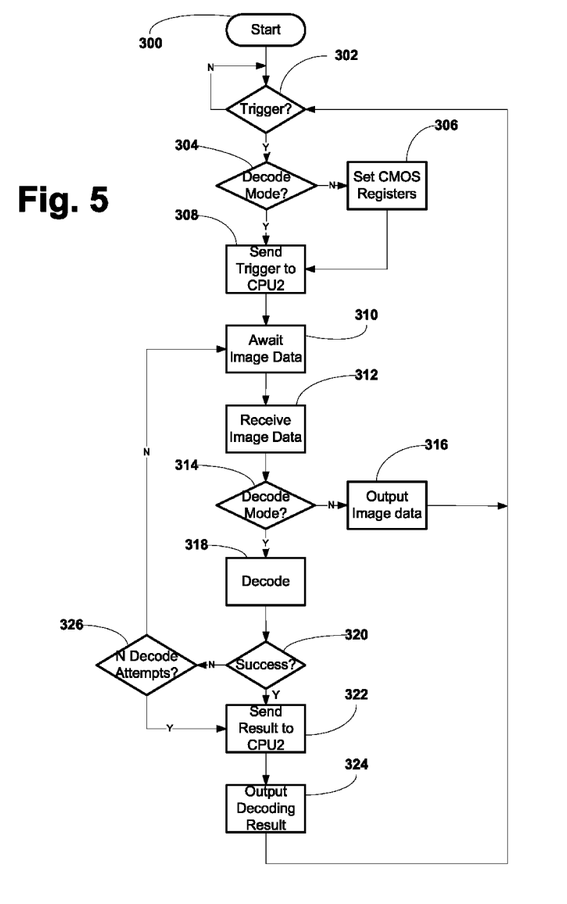
FIG. 5, is a flowchart illustrating a preferred method of operation of CPU1.

FIG. 5 is a flowchart illustrating the preferred operation of CPU1. The process starts at block 300, preferably upon power up of optical code reader 10, and at block 302 CPU1 awaits receipt of a trigger. Typically, it will receive a trigger when an object containing an optical code comes within its range. After a trigger is received, a test is performed at block 304 to determine whether optical reader 10 is in the decode mode. As explained, by design, it is also capable of operating in an image capture mode, where it operates like a video camera and simply produces an image of the optical code. If optical code reader 10 is in the image capture mode, the CMOS registers of sensor 18 are set at block 306, and control transfers to block 308. On the other hand if it is determined at block 304 that optical code reader 10 is in the decode mode, processing transfers from block 304 to block 308.

At block 308, CPU1 sends a trigger command to CPU2. Operation then transfers to block 310, where receipt of image data is awaited. Upon receipt of image data (block 312) a test is performed at block 314 to determine whether optical code reader 10 is in the decode mode. If not, the image data captured by CPU1 is output at block 316, and control transfers to block 302, where CPU1 awaits receipt of another trigger. If the test at block 314 reveals that optical code reader 10 is in the decode mode, CPU1 processes the received image data and attempts to decode it (to recover the information in the code) at block 318.

Operation proceeds to block 320, where a test is performed to determine whether the decode at block 318 was successful and, if so, CPU2 is notified at block 322 that a successful decode has occurred. On the other hand, if the test at block 320 determines that the decode was not successful, a test is performed at block 326 to determine whether a predefined number (N) of decode attempts have been made. If so, control transfer to block 322, where CPU1 notifies CPU2 that decoding has failed. On the other hand, if the test at block 326 reveals that N decode attempts have not been made, control transfers to block 310, where CPU1 awaits receipt of new image data for decoding.

The process ends at block 324, where CPU1 outputs the result of decoding. If decoding was successful, it would output the value contained in the optical code. On the other hand, if decoding failed, it provides a notification to that effect. Control then transfers to block 302, where CPU1 awaits receipt of another trigger.

In the disclosed embodiment, three processors are used. CPU1 performs image decoding, CPU2 performs AGC and autofocus control, and an ASIC (gate array GA) performs specialized image processing. By splitting up the processing burden in this manner, particularly efficient and speedy image processing results, with each processor being optimized for its specialized function. However, the benefits of the invention can still be enjoyed when only a single processor is utilized. For example, the benefit of avoiding recursive AGC processing can still be avoided if a single processor is used, if the functions of CPU1 and CPU2 are performed separately in different threads processed in parallel. The functions of the ASIC could also be programmed into the same single processor.

Although a preferred embodiment of the invention has been disclosed for illustrative purposes, those skilled in the art will appreciate that many additions and modifications, and substitutions are possible without departing from the scope and spirit of the invention as defined by the accompanying claims.

What is claimed is:

1. A method comprising:
   receiving, by an optical code reader, over a range of distances, optical information with a range of optical quality, wherein the optical information defines an image of an optical code;
   decoding, by the reader, the optical information, wherein the optical information is decoded to:
   (i) recover the image of the optical code, and
   (ii) extract image information contained in the optical code; and selecting, by the reader, at least one of:
   (i) an automatic gain control (AGC) to compensate for optical quality variation, and
   (ii) an automatic focus control to compensate for variation in the distance of the optical code from the reader, wherein the selected process is performed by the reader in parallel with decoding the optical information.

2. The method of claim 1 wherein the selected process is initiated ahead of any signal which initiates decoding.

3. The method of claim 1 wherein the selected process is performed periodically and independently of any signal which initiates decoding.

4. The method of claim 1 wherein both the AGC processing and the automatic focus control are selected.

5. The method of claim 1 wherein, when the AGC processing is selected, the AGC processing is initiated ahead of any signal which initiates decoding, and wherein the AGC processing is performed periodically and independently of any signal which initiates decoding.

6. The method of claim 1 wherein the automatic focus control is selected and comprises, using a laser light source, measuring the distance between the optical code and the reader, and adjusting the focus of a variable focus device based upon the distance measurement result.

7. The method of claim 6, further comprising, prior to adjusting the focus:
testing whether the distance measurement was successful;
adjusting the focus based upon the distance measurement if the distance measurement was successful; and
if the distance measurement was unsuccessful, performing an alternate focus test and adjusting focus based upon the alternate focus test.

8. The method of claim 1 wherein the decoding process and the selected process are performed by different first and second processors, respectively, which operate in parallel.

9. The method of claim 8 wherein the second processor performs the selected process without the first processor exercising any control over the performance of the selected process.

10. The method of claim 9 wherein the second processor performs the selected process periodically and independently of any signal in the first processor which initiates decoding.

11. The method of claim 8 wherein both the AGC processing and the automatic focus control are selected.

12. The method of claim 8 wherein the second processor performs the AGC processing, which is initiated without the first processor exercising any control over the second processor, and is performed periodically and independently of any signal in the first processor which initiates decoding.

13. The method of claim 8 wherein the second processor performs the automatic focus control, with a laser light source measuring the distance between the optical code and the reader, and controls the adjustment of the focus of a variable focus device based upon the distance measurement result.

14. The method of claim 13, further comprising, prior to adjusting the focus:
testing whether the distance measurement was successful;
adjusting the focus based upon the distance measurement if the distance measurement was successful; and
if the distance measurement was unsuccessful, performing an alternate focus test and adjusting focus based upon the alternate focus test.

15. The method of claim 8, performed in a reader including an optical sensor which forms an image of the optical code, the method further comprising using a third processor to extract image information from the sensor and providing it to said second processor, the information being one of the distance of the optical code, the brightness of the image, and evaluation of edges in the image.

16. The method of claim 15 wherein the third processor is an application specific integrated circuit (ASIC).

17. The method of claim 15 wherein said second processor provides information to said third processor related to one of autofocus control and AGC processing.

18. An optical code reader comprising:
a first processor, wherein the first processor receives, over a range of distances, optical information with a range of optical quality that defines an image of an optical code, and wherein the first processor decodes the optical information to:
(i) recover an image of the optical code, and
(ii) extract image information contained in the optical code;
a second processor, wherein the second processor performs at least one of:
(i) an automatic gain control (AGC) to compensate for optical quality variation, and
(ii) an automatic focus control to compensate for variation in the distance of the optical code from the reader,
wherein the selected process is performed in parallel with decoding the optical information.

19. The optical code reader of claim 18 wherein the second processor initiates the selected process ahead of any signal which initiates decoding.

20. The optical code reader of claim 18 wherein the second processor performs the selected process and independently of any signal which initiates decoding.

21. The optical code reader of claim 18 wherein the second processor performs both the AGC processing and the automatic focus control.

22. The optical code reader of claim 18 wherein the second processor performs the automatic focus control to control a laser light source to measure the distance between the optical code and the reader, and to control the adjustment of the focus of a variable focus device based upon the distance measurement result.

23. The optical code reader of claim 22 wherein the second processor, prior to adjusting the focus, performs the following steps:
testing whether the distance measurement was successful;
adjusting the focus based upon the distance measurement if the distance measurement was successful; and
if the distance measurement was unsuccessful, performing an alternate focus test and adjusting focus based upon the alternate focus test.

24. The optical code reader of claim 18 wherein a third processor comprises the first and second processors for performing the decoding process and the selected process, respectively, in parallel.

25. The optical code reader of claim 24 wherein the second processor performs the selected process without the first processor exercising any control over the performance of the selected process.

26. The optical code reader of claim 24 wherein the second processor performs the selected process periodically and independently of any signal in the first processor which initiates decoding.

27. The optical code reader of claim 24 wherein the second processor performs the AGC processing, which is initiated without the first processor exercising any control over the second processor, and is performed periodically and independently of any signal in the first processor which initiates decoding.

28. The optical code reader of claim 24 wherein the second processor performs the automatic focus control, with a laser light source measuring the distance between the optical code and the reader, and controls the adjustment of the focus of a variable focus device based upon the distance measurement result.

29. The optical code reader of claim 28, wherein the second processor, prior to adjusting the focus, performs the following steps:
   testing whether the distance measurement was successful;
   adjusting the focus based upon the distance measurement if the distance measurement was successful; and
   if the distance measurement was unsuccessful, performing an alternate focus test and adjusting focus based upon the alternate focus test.

30. The optical code reader of claim 24 wherein the third processor extracts image information from a sensor that forms an image of the optical code, and wherein the extracted image information is provided to said second processor, the image information being one of the distance of the optical code, the brightness of the image, and evaluation of edges in the image.

31. The optical code reader of claim 30 wherein the third processor is an application specific integrated circuit (ASIC).

32. The optical code reader of claim 30 wherein said second processor provides information to said third processor related to one of the autofocus control and the AGC processing.

* * * * *

UNITED STATES PATENT AND TRADEMARK OFFICE
CERTIFICATE OF CORRECTION

PATENT NO. : 8,500,027 B2  Page 1 of 1
APPLICATION NO. : 13/128000
DATED : August 6, 2013
INVENTOR(S) : Kishimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this
Fifteenth Day of September, 2015

Michelle K. Lee
*Director of the United States Patent and Trademark Office*